United States Patent [19]
Powell

[11] Patent Number: 4,889,976
[45] Date of Patent: * Dec. 26, 1989

[54] TAMPER-PROOF ODOMETER

[76] Inventor: Thomas P. Powell, 533 S. Sierra #140, Solana Beach, Calif. 92075

[*] Notice: The portion of the term of this patent subsequent to Feb. 26, 2006 has been disclaimed.

[21] Appl. No.: 881,943

[22] Filed: Jul. 3, 1986

[51] Int. Cl.4 .............................................. G01C 22/00
[52] U.S. Cl. ...................................... 235/96; 235/1 A; 235/117 R; 235/130 R; 235/139 R
[58] Field of Search .............. 235/95 R, 96, 1 A, 1 C, 235/24, 117 R, 130 R, 131 R, 139 R

[56] References Cited
U.S. PATENT DOCUMENTS

| | | | |
|---|---|---|---|
| 2,260,541 | 10/1941 | Schwenn | 235/1 A |
| 2,965,290 | 12/1960 | Blackman et al. | 235/1 A |
| 3,432,096 | 3/1969 | Powell | 235/96 |
| 3,495,773 | 2/1970 | Hachtel | 235/96 |

Primary Examiner—Benjamin R. Fuller

[57] ABSTRACT

A tamper-proof odometer having an odometer register including a plurality of sequentially driven odometer dials carried on a common shaft with a pinion gear supported on an individual bracket disposed between each adjacent pair of dials to engage gears formed as part of each dial of an adjacent pair. A protective cover for the odometer register comprising a shield supported on each of the brackets with all shields forming collectively a partial barrier cover over the odometer register dials exposing only the register readout numbers.

8 Claims, 2 Drawing Sheets

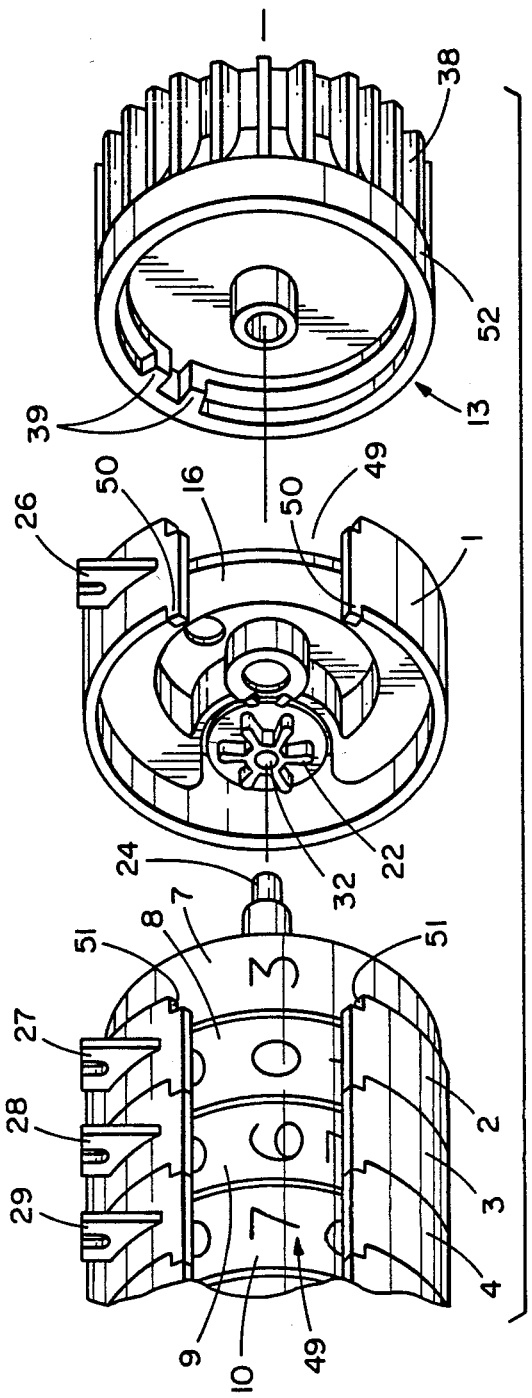
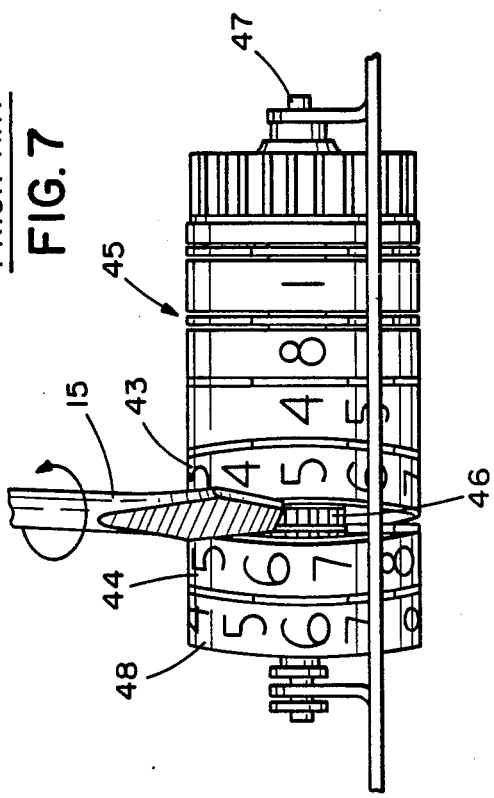
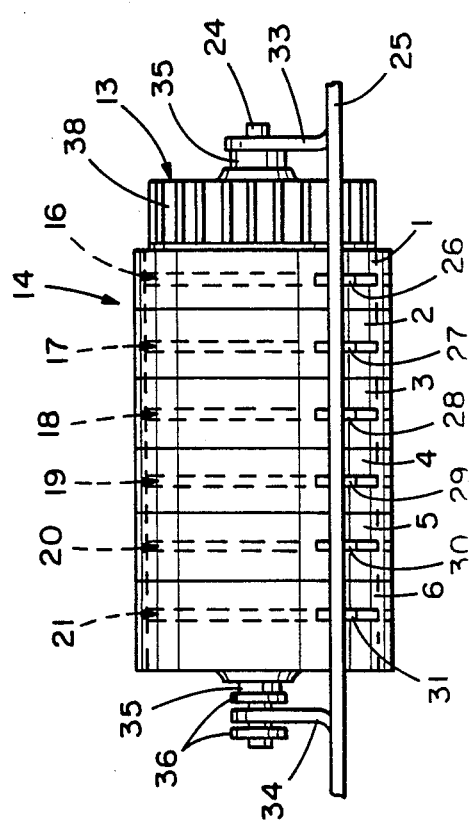

TAMPER-PROOF ODOMETER

BACKGROUND OF THE INVENTION

This invention relates to odometers, and in particular to tamper-proof odometers which indicate usage, such as vehicular elapsed mileage.

Odometers are well known in the art. They are used extensively to measure and indicate elapsed mileage traveled by various vehicles, such as rental cars and trucks and private passenger cars and trucks. Accurate odometer readings are necessary for correct charges on rental vehicles. Correct odometer readings are also used by buyers and sellers of used passenger cars and trucks to determine a fair price using the accumulated mileage as a guide to the wear on the vehicle.

Many of the prior art odometers can be easily turned back to indicate falsely a lower mileage than the actual mileage, thus leading the buyer to believe the vehicle has more monetary value. The setting back of odometers is usually done by professionals who have special tools that can be inserted into openings in instrument panels, such as lampholes, to reach the odometer. With access to the odometer, a higher order odometer dial is disengaged from its driving pinion gear to free the odometer dial so that it can be turned back to any false number desired.

SUMMARY OF THE INVENTION

A principal object of this invention is to improve the reliability of odometer readings by making it difficult to set back odometers.

Another object of this invention is to improve the visible detection of odometer tampering by requiring the destruction of part of the odometer in order to effect setback.

Another object of this invention is to facilitate the assembly of odometer registers.

A principal structural feature for attaining the objects of this invention relates to the addition of a partially cylindrical shield to each of the pinion supporting brackets to form a protective barrier which covers the pinion gears which drive the odometer register dials.

In the usual prior art vehicular odometer, pinion support brackets are located between each pair of adjacent dials and also between the main odometer drive gear and the lowest order odometer dial. Accordingly, a preferred embodiment of the invention features a series of interlocking shields which partially cover the entire series of odometer register dials. A readout window is defined by the shields exposing only the portion of the dials that bear the odometer readout numbers. Since the pinions are preferably located diametrically opposite the readout numbers, access to the pinions cannot be attained through the window defined by the shields, or from the rear of the odometer register. Additionally, the interlocking shields lock the brackets in their proper position in the odometer register, thus providing easier assembly of the odometer register.

DETAILED DESCRIPTION OF THE DRAWINGS

In order that all the structural features for attaining the objects of this invention may be readily understood, reference is made to the accompanying drawings in which:

FIG. 5 is an exploded, perspective view of the components forming the main drive gear, lowest order bracket and pinion, and the four lowest order odometer dials with the bracket shield covering the odometer register, except the readout numbers;

FIG. 6 is a top view taken along line 6—6 in FIG. 1 illustrating the protective coverage of the odometer register by the bracket shields; and, FIG. 7 is an elevational view of a prior art odometer illustrating the manner in which a tool can be inserted between adjacent odometer dials to set the odometer back by separating a pinion from its otherwise mating dial ring gear.

DETAILED DESCRIPTION OF THE PREFERRED EMBODIMENT

Figure 1:
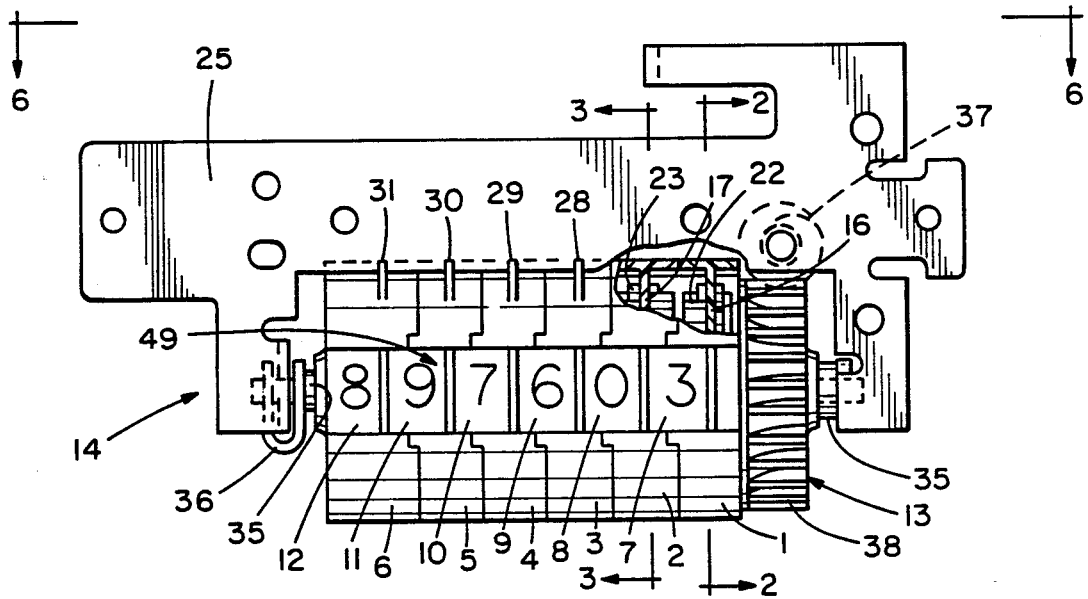
FIG. 1 is a front elevational view of an odometer assembly incorporating the structural features of the present invention.

Referring now to the drawings, the principal structural feature of this invention is embodied in a series of interlocking shields 1 through 6 which protectively cover the odometer register dials 7 through 12 and main drive gear 13 of the otherwise generally conventional odometer assembly 14 (FIGS. 1, 5 and 6). Shields 1 through 6 are partial cylinders which leave exposed the numerals, or other readout indicia, contained on the peripheral surfaces of dials 7 through 12. The shields thus prevent the insertion of a wedging tool, such as screw driver 15 (FIG. 7), to separate mated gear elements in the gear chain so that accurate dial readings cannot be tampered with by "rolling back" the dials.

The following detailed description of odometer assembly 14 and its gear chain will facilitate an understanding of the invention. The odometer gear chain includes a series of six pinion gears which are individually carried on one of six brackets 16 through 21 (FIG. 6) which also support one of the six shields 1 through 6, respectively. Details of brackets 16 and 17 are shown in FIGS. 2 through 5. All of the brackets are essentially identical in construction and all operatively support a single pinion gear, such as pinion 22 carried on bracket 16 (FIGS. 2, 4 and 5) and pinion 23 carried on bracket 17. Main drive gear 13 drives pinion 22, pinion 22 drives dial 7, and dial 7 in turn drives dial 8 through pinion 23, and so on until dial 12 is actuated by its driving pinion.

Dials 7 through 12 and main drive gear 13 are rotatably supported on shaft 24. Brackets 16 through 21 and their pinions are also carried on shaft 24. The brackets are fixed with respect to odometer frame 25 by yokes 26 through 31 which engage the frame. Accordingly, each pinion rotates on a fixed short cantilevered shaft, such as pinion 22 carried on shaft 32 which is supported on bracket 16.

Shaft 24 is carried on a pair of spaced support flanges 33 and 34 (FIG. 6) which are part of frame 25. Dials 7 through 12, brackets 16 through 21, and main drive gear 13 of the odometer register are operatively positioned and retained on shaft 24 by washers 35. U-clip 36 retains the odometer register on frame 25. Washers 35 and U-clip 36 are fixed to shaft 24 by a tight press fit. In an automotive application, frame 25 and its associated components are mounted in a speedometer assembly.

The odometer dial mechanism renders an elapsed mileage readout in the following sequence.

Figure 2:
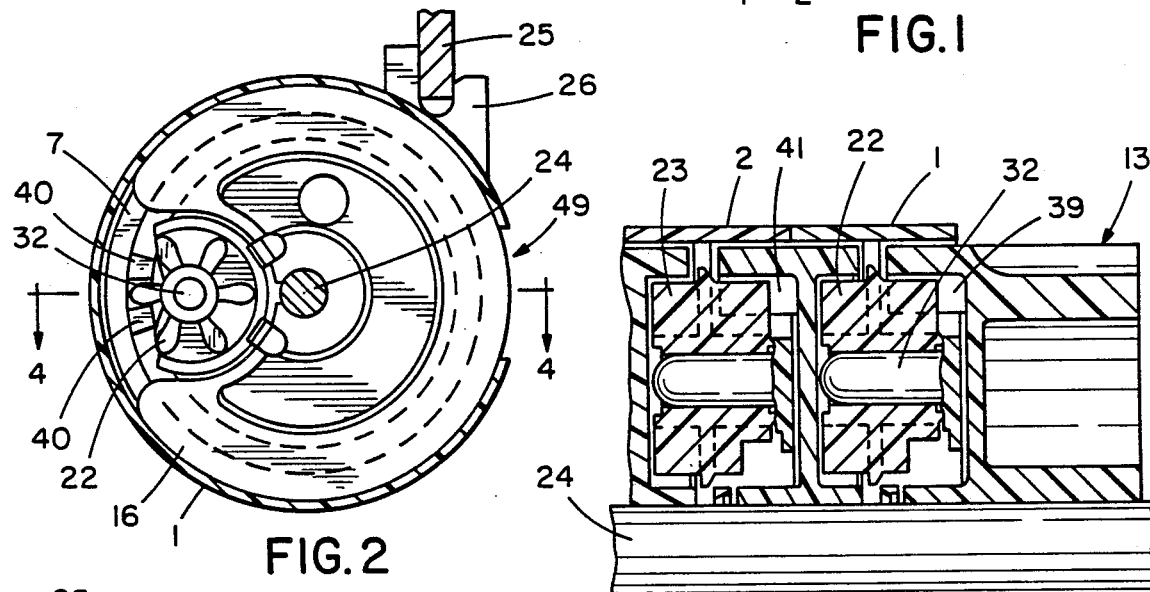
FIG. 2 is a sectional view taken along line 2—2 in FIG. 1 illustrating the relationship between the main drive gear and its associated lowest order odometer dial in transferring motion through a bracket supported pinion to rotate the lowest order odometer dial by one digit.
Figure 3:
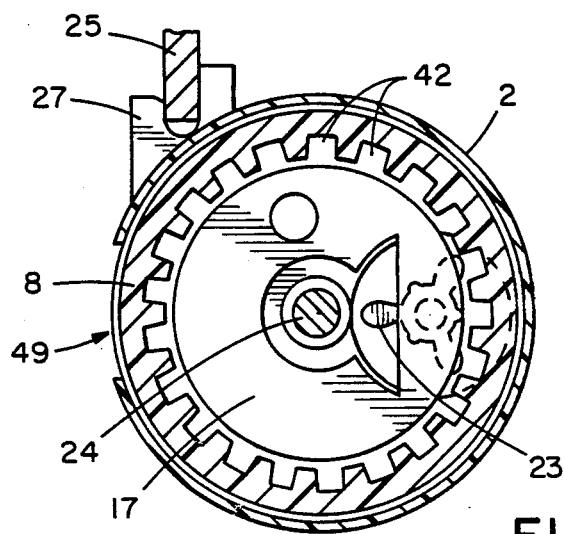
FIG. 3 is a sectional view taken along line 3—3 in FIG. 1 through an odometer dial illustrating the relationship between a pinion, bracket and the ring gear side of the second lowest order odometer dial.
Figure 4:
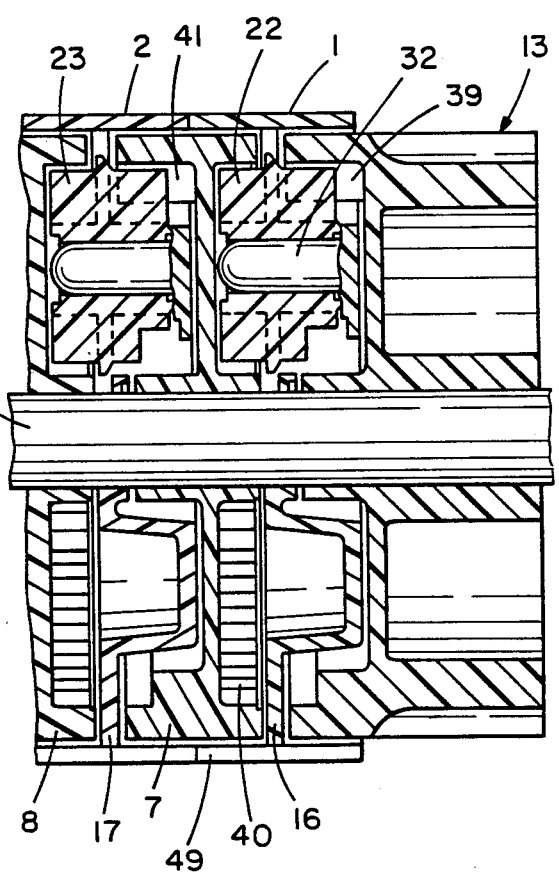
FIG. 4 is a sectional view taken along line 4—4 in FIG. 2 illustrating the bracket placement and the pinion coaction between the adjacent two lowest order odometer dials.

A spiral gear 37, shown in broken line in FIG. 1, is rotated by a flexible shaft or other means (not shown) so that the rate of rotation is responsive to distance traveled, for example. Main drive gear 13 moves responsively because its ring of external gear teeth 38 mesh with gear 37. Two internal spaced teeth 39 (FIG. 5) are formed on the output end of main drive gear 13. Teeth 39 engage pinion 22 for a short angular distance during each evolution of main drive gear 13 (FIGS. 1, 5). Pinion 22 engages and drives an internal ring of gear teeth 40 of dial 7 to rotate responsively that dial (FIGS. 2, 4). Dial 7 has two internal spaced teeth 41 (FIG. 4) similar to teeth 39 of main drive gear 13. Teeth 41 engage pinion 23 (FIG. 3) for a short angular distance during each revolution of dial 7. Pinion 23 engages and drives the internal ring of gear teeth 42 (FIG. 3) of dial 8 to rotate that dial. The higher order dials, 9, 10, 11 and 12, are each successively driven in the same manner that dial 7 drives dial 8.

U.S. Pat. No. 3,432,096 issued Mar. 11, 1969, for Pinion Assembly shows and describes in greater detail the basic prior art odometer assembly to which the present invention is applied.

Because of the interlocking of dials 7 through 12 by the coupling provided by the gears, the dials cannot be routinely driven backwardly to reduce a mileage readout, for example, without destroying the odometer mechanism. However, if a tool, such as screwdriver 15 (FIG. 7), is wedged between adjacent dials 43 and 44 of a typical prior art odometer assembly 45, then pinion 46 can be forced sufficiently so as to disengage pinion 46 from the otherwise mating ring of internal gear teeth of dial 44. There is usually sufficient "give" in the odometer dials and pinion support brackets carried on support shaft 47 that no permanent harm to the odometer components results from odometer tampering effected by a wedging tool.

With pinion 46 disengaged from dial 44, both of the higher order dials 44 and 48 can be either manually reversed or reversed by repeated short twists of screwdriver 15 or by an elongate tool, such as a second screwdriver (not shown), which is applied to an exposed peripheral surface of the higher order dials.

The composite set of interlocking shields 1 through 6 form a protective barrier which completely covers odometer dials 7 through 12, except for the elongated dial window 49 overlying dial readout numbers 897603 of FIGS. 1 and 5, for example. This window is located at the front of the odometer adjacent the observing window (not shown) of the instrument panel of the observing window (not shown) of the instrument panel of which the odometer is a part. The odometer dials and pinions are therefore not easily accessible from the panel front because of the protection afforded by the glass or plastic forming the panel window. Even if the panel window were easily removable, as is best shown in FIGS. 2 and 3, the pinion gears 22 and 23, for example, are located diametrically opposite dial window 49 and to the rear of the odometer. As such a wedging tool inserted from the front of the odometer assembly would probably permanently damage the mechanism in the process of separating a pinion from its mating ring gear of the adjacent higher order dial. The adjacent and contacting edges of shields 1 through 6 are preferably formed with mating fingers and notches, such as fingers 50 of shield 1 and notches 51 of shield 2 (FIG. 5), to align and lock all of the shields together. Lowest order shield 1 need not have notches since it abuts main drive gear 13, and highest order shield 6 need not be formed with fingers since that shield does not abut a higher order shield. Middle order shields 2 through 5, each overlap two dials by extending to the middle of those dials. Lowest order shield 1 extends from the middle of dial 7 to overlap the smooth ringlike shoulder 52 of main drive gear 13, and higher order shield 6 extends from the middle dial 11 to the left edge of dial 12. This overlapping and interlocking disposition of shields 1 through 6 provides an effective barrier to odometer tampering since all of the pinions supported on brackets 16 through 21 are completely covered. Any effort to insert a wedging tool from the rear of the odometer to disengage a pinion from its mating dial ring gear would of necessity permanently damage the odometer. The resulting odometer damage would provide permanent evidence of odometer tampering.

In a preferred embodiment, each of shields 1 through 6 and supporting brackets 16, 17, 18, 19, 20, or 21, may be molded as a single plastic part. Manufacture of the odometer assembly is thus simplified and the protective barrier provided by shields 1 through 6 is strengthened.

It should be understood that the above described preferred embodiment is merely illustrative of the principles of this invention, and that changes can be made without departing from the scope of the invention.

What is claimed is:

1. In a tamper-proof odometer having an odometer register including a plurality of sequentially driven odometer dials carried on a common shaft with a pinion gear supported on an individual bracket disposed between each adjacent pair of dials to engage gears formed as part of each dial on an adjacent pair, the improvement comprising a shield supported on each of the brackets with all shields interlocked one to the other to form collectively a partial barrier cover over the odometer register dials exposing only the register readout numbers.

2. The combination of claim 1 in which the shields are generally partial cylinders.

3. The combination of claim 1 in which each shield overlies both of the dials of an adjacent pair of dials.

4. The combination of claim 3 in which a plurality of the shields are partial cylinders interlocked one to the other.

5. In a tamper-proof odometer having an odometer register including a plurality of sequentially driven odometer dials and a main drive gear carried on a common shaft with a pinion gear supported on an individual bracket disposed between each adjacent pair of dials and also the lowest order dial and the main drive gear to engage gears formed as part of each dial of an adjacent pair and also to engage the main drive gear and the lowest order dial, the improvement comprising a shield supported on each of the brackets with all shields interlocked one to the other to form collectively a partial barrier cover over the odometer register dials and the main drive gear and forming a window exposing the register readout numbers.

6. The combination of claim 5 in which the shields are generally partial cylinders.

7. The combination of claim 5 in which each shield supported on a bracket located between an adjacent pair of dials overlies both of the dials of an adjacent pair of dials, and the shield disposed on the bracket located between the main drive gear and the lowest order dial overlies both the gear and the lowest order dial.

8. The combination of claim 7 in which a plurality of the shields are partial cylinders interlocked one to the other.

* * * * *